United States Patent
Ahn

(10) Patent No.: US 11,934,953 B2
(45) Date of Patent: Mar. 19, 2024

(54) IMAGE DETECTION APPARATUS AND OPERATION METHOD THEREOF

(71) Applicant: SAMSUNG ELECTRONICS CO., LTD., Suwon-si (KR)

(72) Inventor: Youngchun Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 17/354,270

(22) Filed: Jun. 22, 2021

(65) Prior Publication Data

US 2021/0406577 A1    Dec. 30, 2021

(30) Foreign Application Priority Data

Jun. 26, 2020 (KR) .................. 10-2020-0078809

(51) Int. Cl.
| | |
|---|---|
| G06N 3/00 | (2023.01) |
| G06F 18/213 | (2023.01) |
| G06F 18/24 | (2023.01) |
| G06N 3/08 | (2023.01) |
| G06V 10/82 | (2022.01) |

(Continued)

(52) U.S. Cl.
CPC ............ G06N 3/08 (2013.01); G06F 18/213 (2023.01); G06F 18/24 (2023.01); G06V 10/82 (2022.01);
(Continued)

(58) Field of Classification Search
CPC ........ G06N 3/08; G06N 3/045; G06F 18/213; G06F 18/24; G06V 10/82; G06V 20/62;
(Continued)

(56) References Cited

U.S. PATENT DOCUMENTS

2017/0206227 A1   7/2017   Hwang et al.
2019/0212887 A1*   7/2019   Soh .................. G06F 3/0484
(Continued)

FOREIGN PATENT DOCUMENTS

KR        102056822 B1   12/2019
KR   1020200071031 A   6/2020
(Continued)

OTHER PUBLICATIONS

"StyleGAN—Official TensorFlow Implementation", NVlabs / stylegan, https://github.com/nvlabs/stylegan, 2021, 9 pages total.
(Continued)

*Primary Examiner* — Ping Y Hsieh
*Assistant Examiner* — Xiao Liu
(74) *Attorney, Agent, or Firm* — Sughrue Mion, PLLC

(57) ABSTRACT

An image detection apparatus includes: a display outputting an image; a memory storing one or more instructions; and a processor configured to execute the one or more instructions stored in the memory to: detect, by using a neural network, an additional information area in a first image output on the display; obtain style information of the additional information area from the additional information area; and detect, in a second image output on the display, an additional information area having style information different from the style information by using a model that has learned an additional information area having new style information generated based on the style information.

16 Claims, 14 Drawing Sheets

(51) Int. Cl.
*G06V 20/62* (2022.01)
*G06V 30/244* (2022.01)

(52) U.S. Cl.
CPC ............ *G06V 20/62* (2022.01); *G06V 20/635* (2022.01); *G06V 30/245* (2022.01); *G06V 2201/02* (2022.01)

(58) Field of Classification Search
CPC ............... G06V 20/635; G06V 30/245; G06V 2201/02; G06V 20/40; G06V 20/63; G06V 30/10; H04N 21/44008; H04N 21/4348; H04N 21/4666; H04N 21/4668
See application file for complete search history.

(56) References Cited

U.S. PATENT DOCUMENTS

2020/0097730 A1    3/2020    Kim et al.
2020/0105029 A1*   4/2020    Jung .......................... G06T 5/50
2020/0160494 A1*   5/2020    Hwang .................. G06F 17/15
2020/0302182 A1    9/2020    Ahn

FOREIGN PATENT DOCUMENTS

WO         2019/088592 A1      5/2019
WO      WO-2019088592 A1 *     5/2019    ......... G06K 9/00744

OTHER PUBLICATIONS

International Search Report (ISA/PCT/210) dated Oct. 1, 2021 issued by the International Searching Authority in application No. PCT/KR2021/007562.

Karras, T., et al., "A Style-Based Generator Architecture for Generative Adversarial Networks", arXiv:1812.04948v1 [cs.NE], Dec. 12, 2018, pp. 1-12.

* cited by examiner

FIG. 1
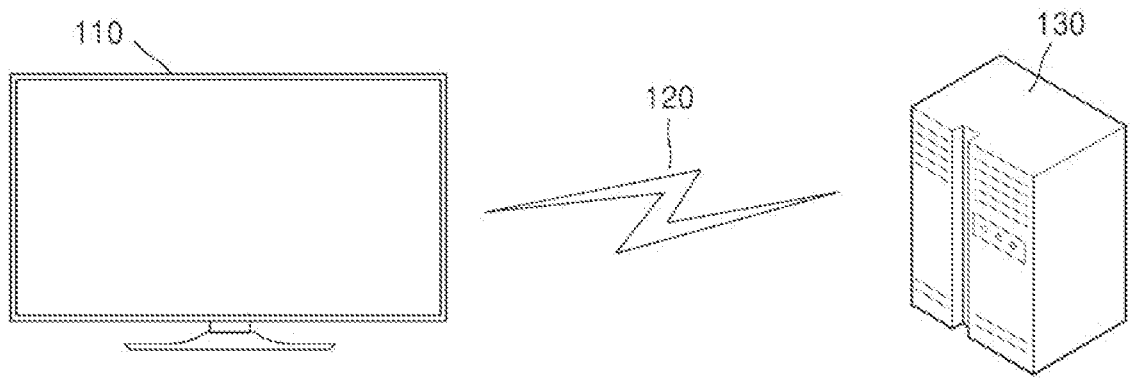
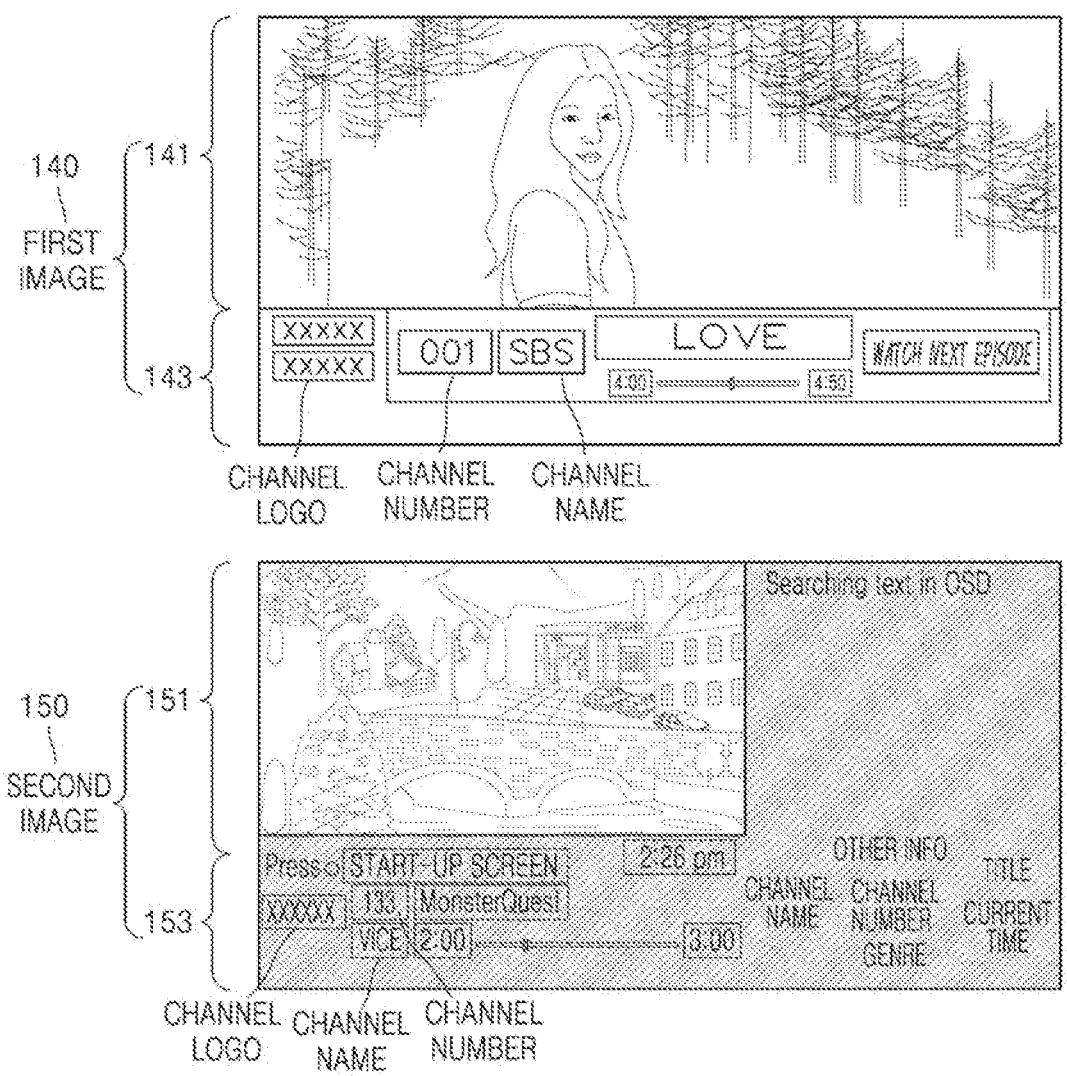

IMAGE DETECTION APPARATUS AND OPERATION METHOD THEREOF

CROSS-REFERENCE TO RELATED APPLICATION

This application is based on and claims priority under 35 U.S.C. § 119 to Korean Patent Application No. 10-2020-0078809, filed on Jun. 26, 2020, in the Korean Intellectual Property Office, the disclosure of which is incorporated by reference herein in its entirety.

BACKGROUND

1. Field

The disclosure relates to image detection apparatuses and operation methods thereof, and more particularly, to image detection apparatuses that detects, based on a display format of a subsidiary content display area in a previous image, a subsidiary content display area in a new image even when the subsidiary content display area in the new image has a different display format from the display format of the subsidiary content display area in the previous image, and operating methods thereof.

2. Description of the Related Art

A recommender system is a system that recommends movies, content, or items to users. Based on a history of people's consumption of programs provided by broadcasting stations or online video content providing servers, marketers who want to make recommendations or advertisements recommend new content or items to users or select suitable potential customers from among a large number of people to perform advertisements tailored to the selected potential customers.

An artificial intelligence (AI) system is a system that enables machines to derive desired results or perform targeted operations by learning and making decisions on their own.

SUMMARY

Provided are image detection apparatuses for detecting an additional information area in an image by using an artificial intelligence (AI) model, and operation methods of the image detection apparatuses.

Also, provided are image detection apparatuses for obtaining style information from an additional information area, and operation methods thereof.

Also, provided are image detection apparatuses for generating new style information based on obtained style information and detecting, by using a model that has learned the new style information, an additional information area having style information different from previously obtained style information, and operation methods of the image detection apparatuses.

Additional aspects will be set forth in part in the description which follows and, in part, will be apparent from the description, or may be learned by practice of the presented embodiments of the disclosure.

According to an embodiment of the disclosure, an image detection apparatus includes: a display; a memory storing one or more instructions; and a processor configured to execute the one or more instructions stored in the memory to: detect, by using a neural network, a first additional information area in a first image that is output on the display; obtain first style information of the first additional information area from the first additional information area; and detect, in a second image that is output on the display, a second additional information area having second style information different from the first style information by using an artificial intelligence (AI) model that has learned to detect a new additional information area having new style information based on given style information.

The processor may be further configured to execute the one or more instructions to: update the neural network by using the AI model that has learned to detect the new additional information area having the new style information; and detect, in the second image, the second additional information area having the second style information by using the updated neural network.

The image detection apparatus of claim may further include a neural network processor configured to generate the second additional information area having the second style information based on the first style information, and obtain the AI model for outputting a new image by learning the second additional information area having the second style.

The image detection apparatus may further include a communication interface configured to transmit the first style information to a computing device and receive the AI model from the computing device.

The processor may be further configured to execute the one or more instructions to obtain text information and color information from the first additional information area and obtain the first style information from the text information and the color information.

The first style information may include at least one of a location of the first additional information area in the first image, a background color of the first additional information area, a background texture of the first additional information area, a layout of texts included in the first additional information area, a text type, a text font, a text color, or a text texture.

The processor may be further configured to execute the one or more instructions to recognize the first image based on the text information.

The processor may be further configured to execute the one or more instructions to extract a text region from the first additional information area, recognize a text in the text region, and classify the recognized text into different classes to obtain the text information.

The processor may be further configured to execute the one or more instructions to extract a feature map from the first additional information area and analyze the feature map to extract the text region.

The processor may be further configured to execute the one or more instructions to classify the text into at least one class from among a channel name, a channel number, a title, a playback time, and other information.

The processor may be further configured to execute the one or more instructions to recognize, in the text region, at least one of a number, a word, a language of the word, or a font in order to recognize the text.

According to another embodiment of the disclosure, a computing device includes: a memory storing one or more instructions; and a processor configured to execute the one or more instructions stored in the memory to: generate, by using at least one neural network, an additional information area having new style information based on style information obtained from an additional information area included in an image; and obtain a model for outputting a new image by learning an image including the additional information area having the new style information.

According to another embodiment of the disclosure, an image detection method includes: detecting, by using a neural network, a first additional information area in a first image; obtaining first style information of the first additional information area from the first additional information area; and detecting, in a second image, a second additional information area having second style information different from the first style information, by using an artificial intelligence (AI) model that has learned to detect a new additional information area having new style information generated based on given style information.

According to another embodiment of the disclosure, a computer-readable recording medium has recorded thereon a program for performing an image detection method including: detecting, by using a neural network, a first additional information area in a first image; obtaining first style information of the first additional information area from the first additional information area; and detecting, in a second image, a second additional information area having second style information different from the first style information, by using an artificial intelligence (AI) model that has learned to detect a new additional information area having new style information generated based on given style information.

According to another embodiment of the disclosure, an electronic device may include: a display configured to output a primary content and a subsidiary content in a same display screen; a memory storing one or more instructions; and a processor configured to execute the one or more instructions stored in the memory to: detect a first subsidiary content area in a first image; identify, from the first subsidiary content area, a first display format of the first subsidiary content area; and detect, a second subsidiary content area of a second display format in a second image, by inputting the first display format to a neural network model that is trained to detect a new subsidiary content area of a new display format based on a given display format of a given subsidiary content area.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a diagram for explaining an operation of an image detection apparatus detecting an additional information area in an image, according to an embodiment of the disclosure;

DETAILED DESCRIPTION

Figure 2:
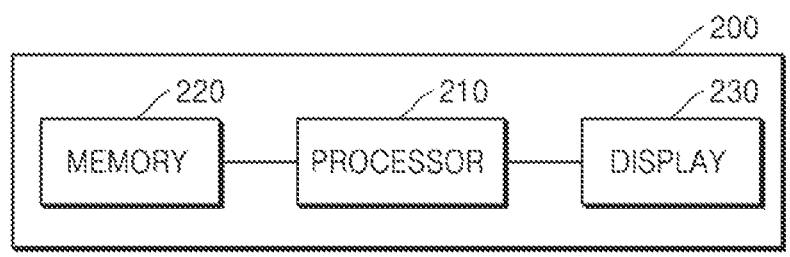
FIG. 2 is a block diagram of an image detection apparatus according to an embodiment of the disclosure.

Embodiments of the disclosure will now be described more fully hereinafter with reference to the accompanying drawings so that they may be easily implemented by those of ordinary skill in the art. However, embodiments of the disclosure may have different forms and should not be construed as being limited to the embodiments set forth herein.

Terms used in the disclosure are general terms currently widely used in the art based on functions described in the disclosure, but may have different meanings according to an intention of one of ordinary skill in the art, precedent cases, or advent of new technologies. Thus, the terms used herein should be construed not based on simple appellations thereof but based on the meaning of the terms together with the overall description of the disclosure.

In addition, the terms used herein are only used to describe particular embodiments of the disclosure, and are not intended to limit the disclosure.

Throughout the specification, it will be understood that when a part is referred to as being "connected" or "coupled" to another part, it may be directly connected to or electrically coupled to the other part with one or more intervening elements interposed therebetween.

The use of the terms "the" and similar referents in the context of describing the disclosure (especially in the context of the following claims) are to be construed to cover both the singular and the plural. Furthermore, operations of methods according to the disclosure described herein may be performed in any suitable order unless clearly specified herein. Embodiments of the disclosure are not limited to the described order of the operations.

Expressions such as "in some embodiments" or "in an embodiment" described in various parts of this specification do not necessarily refer to the same embodiment(s).

Some embodiments of the disclosure may be described in terms of functional block components and various processing operations. Some or all of such functional blocks may be implemented by any number of hardware and/or software components that perform specific functions. For example, functional blocks of the disclosure may be implemented by one or more microprocessors or by circuit components for performing certain functions. Furthermore, functional blocks according to the disclosure may be implemented with any programming or scripting language. The functional blocks may be implemented using various algorithms executed on one or more processors. Furthermore, the disclosure may employ techniques of the related art for electronics configuration, signal processing and/or data processing. The terms "mechanism", "element", "means", and "construction" are used broadly and are not limited to mechanical or physical configurations.

Furthermore, connecting lines or connectors shown in various figures are intended to represent exemplary functional relationships and/or physical or logical couplings between components in the figures. In an actual device, connections between components may be represented by alternative or additional functional relationships, physical connections, or logical connections.

Throughout the disclosure, the expression "at least one of a, b or c" indicates only a, only b, only c, both a and b, both a and c, both b and c, all of a, b, and c, or variations thereof.

Furthermore, terms, such as "portion," "module," etc., used herein indicate a unit for processing at least one function or operation and may be embodied as hardware or software or a combination of hardware and software.

Furthermore, in the specification, the term "user" refers to a person who controls functions or operations of an image detection apparatus or computing device by using the image detection apparatus or computing device or who uses the image detection apparatus according to its functions, and the user may include a viewer, a network administrator, or an installation engineer. In addition, in the specification, the term "consumer" may mean a user who uses an image detection apparatus suitably for an intended purpose.

Embodiments of the disclosure will be described in more detail with reference to the accompanying drawings.

FIG. 1 is a diagram for explaining an operation of an image detection apparatus 110 detecting an additional information area in an image, according to an embodiment of the disclosure.

Referring to FIG. 1, the image detection apparatus 110 may communicate with a computing device 130 via a communication network 120. The image detection apparatus 110 may be implemented as various types of electronic devices capable of communicating with the computing device 130 via a wire or wirelessly.

In an embodiment of the disclosure, the image detection apparatus 110 may be an image display apparatus. The image display apparatus may be a television (TV), but is not limited thereto, and may be implemented as an electronic device including a display. For example, the image display apparatus may include at least one of a desktop, a smartphone, a tablet personal computer (PC), a mobile phone (mobile phone), a video phone, an e-book reader, a laptop PC, a netbook computer, a digital camera, a personal digital assistant (PDA), a portable multimedia player (PMP), a camcorder, a navigation device, a wearable device, a smart watch, a home network system, a security system, or a medical device.

The image detection apparatus 110 may be of a fixed or movable device, and may include a digital broadcasting receiver or a digital TV tuner that is capable of receiving digital broadcasting signals.

The image detection apparatus 110 may be implemented as a flat display apparatus, a curved display apparatus, which includes a screen having a fixed curvature, or a flexible display apparatus capable of adjusting a curvature. An output resolution of the image detection apparatus 110 may include, for example, high definition (HD), full HD, ultra HD, or a resolution higher than ultra HD.

The image detection apparatus 110 may be connected to a source device. The source device may include at least one of a PC, a digital versatile disc (DVD) player, a video game console, a set-top box, an audio/video (AV) receiver, a cable-based receiving system or satellite broadcast receiving system, or an Internet-based receiving system for receiving content from over-the-top (OTT) or Internet protocol television (IPTV) service providers. OTT or IPTV service providers may provide digital television services to consumers using IPs over broadband connections. In this way, the consumers may receive and use real-time broadcasts. In addition, these service providers may provide video on demand (VOD) services so that consumers may receive and use desired content by streaming or downloading the content at a desired time. Terrestrial broadcasting stations, cable broadcasting stations, OTT service providers, or IPTV service providers for providing content with consumers are to be hereinafter referred to as content providers.

The image detection apparatus 110 may receive, from the source device, content to be output. In an embodiment of the disclosure, the content may include items such as various movies or dramas through VOD services or TV programs provided by content providers, and may include one or more of a video signal, an audio signal, and a text signal.

The image detection apparatus 110 may capture an image output to a user on a screen of the image detection apparatus 110 at certain time intervals. The image detection apparatus 110 may analyze the captured image to obtain information about content viewed by the user. The information about the content viewed by the user may be collected from another server and used to identify a user's tendency to consume content, a user's preference for content, or the like or utilized for recommendation or advertisement services, etc.

The image detection apparatus 110 may receive a user's control command via a user interface included therein. The user interface may be attached to the image detection apparatus 110 in the form of a button or a keypad. When a display of the image detection apparatus 110 is formed as a touchscreen, the user interface may also be implemented as a touchscreen, and in this case, a control command may be received via a user's finger or an input pen. Alternatively, the image detection apparatus 110 may be controlled by a control device that is separate therefrom, and the control device may be implemented as various types of devices, such as a remote controller or mobile phone, for controlling the image detection apparatus 110. The control device may control the image detection apparatus 110 by using short-range communication including infrared or Bluetooth. The control device may control a function of the image detection apparatus 110 by using at least one of a key or button provided thereon, a touchpad, a microphone capable of receiving a user's voice, or a sensor capable of recognizing motion of the control device.

The control device may include a power on/off button for turning on or off power of the image detection apparatus 110. Furthermore, the control device may be used to change a channel output by the image detection apparatus 110, adjust a volume on a channel, select a terrestrial broadcast/cable broadcast/satellite broadcast, or set an environment based on a user input. In addition, the control device may be a pointing device. For example, the control device may operate as a pointing device when receiving a particular key input.

When a user changes a channel or program output by the image detection apparatus 110 by using the user interface or control device, information about the new channel or program may be output on the screen of the image detection apparatus 110 for a certain time period. In other words, when a channel is changed, the image detection apparatus 110 may output a program (e.g., primary content data) for the new channel simultaneously with information (e.g., subsidiary data) describing the other channel or the program output therefrom, and the program and the information may be both included in an image to be output. Information describing a channel or a program is hereinafter referred to as subsidiary data or additional information. The additional information includes at least one of a channel number, a channel name, a title of the program of the primary content data, information indicating a total playback time the program of the primary content data, an elapsed time of the program of the primary content data, and a remaining time of the program of the primary content data, information about characters appearing in the program of the primary content data, or a genre of the program of the primary content data. The subsidiary data may be complementary to or may correspond to the primary content data, but may be independent of the primary content data. An area including a plurality of pieces of subsidiary data or additional information is referred to as a subsidiary data display area or an additional information area.

When a channel or program is changed, the user may identify a name of the new channel, a title of the new program, by using an additional information area that is output together with the corresponding content, and easily recognize a total playback time for content currently being output, how far playback of the content has progressed, etc.

Referring to FIG. 1, the image detection apparatus 110 may output a first image 140 in response to a user's request to change a channel. The first image 140 may include a first additional information area 143 together with content 141 output from the new channel. The first additional information area 143 may include at least one of a channel name, a channel number, a title of content, a playback time, or other additional information.

The image detection apparatus 110 may capture an RGB image that is output to the user on the screen of the image detection apparatus 110 at certain time intervals, e.g., at 0.5 second intervals, and identify a user's viewing tendency or the like based on the captured RGB image.

In an embodiment of the disclosure, the image detection apparatus 110 may detect an additional information area based on a captured image. For example, in the above embodiment of the disclosure, the image detection apparatus 110 may detect the first additional information area 143 in the first image 140 that is output to the current screen and captured at the certain time intervals.

In an embodiment of the disclosure, the image detection apparatus 110 may detect an additional information area in an image by using at least one neural network. The at least one neural network may be a neural network trained to detect, in an input image, an additional information area having the same or similar style (e.g., the same or similar display format, the same or similar object arrangement format, etc.) to that of the first additional information area 143. For example, the neural network may be a neural network trained with respect to a dataset using a supervised learning method. The neural network may detect an additional information area that is the same as or similar to the learned dataset. Because the neural network used by the image detection apparatus 110 is trained to detect an additional information area having first style information, when an additional information area having second style information that is not similar to the first style information is included in an image, the neural network fails to recognize an additional information area having the second style information.

Content providers occasionally change a style of an additional information area output together with an image to a new style for every certain time period or during a special season such as the Christmas season. For example, it is assumed that a content provider has changed a style of an additional information area to the same style as that of a second additional information area 153 of FIG. 1. The second additional information area 153 is different from the first additional information area 143 in terms of locations where a channel name, a channel number, a title, etc. are output, a color of a background and a font of a text included in an additional information area, etc. In this case, the neural network that has learned a style of the existing additional information area fails to recognize and detect the second additional information area 153 in an image.

In an embodiment of the disclosure, after detecting the first additional information area 143 in the first image 140, the image detection apparatus 110 may generate training data using the first additional information area 143. To do so, the image detection apparatus 110 may obtain style information of the first additional information area 143 from the detected first additional information area 143. For convenience of description, style information of the first additional information area 143 is hereinafter referred to as first style information, and style information of the second additional information area 153 is hereinafter referred to as second style information.

Style information may mean the overall look, feel, composition, etc., of an additional information area. The style information may include information about a texture, color, mood, contrast, gloss, or intensity, hue, and saturation, which are the three elements of color, of the entire additional information area or a background and text in the additional information area. In addition, the style information may include at least one of an arrangement or location of an additional information area in an image, an arrangement or locations of texts included in the additional information area, a type of each text, or a font of each text.

The style information may be also referred to as a display format. The display format may be defined by any one or any combination of color, an arrangement of text, characteristics, and graphic objects, and a layout of text, characteristics, and graphic objects, a font size, and a font style.

After obtaining the first style information, the image detection apparatus 110 may obtain the first style information and transmit the same to the computing device 130 via the communication network 120.

The computing device 130 may include at least one hardware chip and may be mounted to an electronic device, or may be included in a server in the form of a chip or electronic device. Alternatively, the computing device 130 may be implemented as a software module.

In an embodiment of the disclosure, the computing device 130 may collect style information from the image detection apparatus 110 and generate new style information based on the collected style information. The computing device 130 may generate a new image by synthesizing general content with an additional information area having the new style information. The computing device 130 may also train a model to detect an additional information area in the new image. The computing device 130 may transmit the trained model to the image detection apparatus 110 via the communication network 120.

The image detection apparatus 110 may receive a model (e.g., an AI model) from the computing device 130 via the communication network 120 and update the original neural network by using the received model.

As described above, the neural network used by the image detection apparatus 110 may detect only an additional information area that is of the same or similar style to a previously learned one. In order for the neural network to recognize an additional information area of a new style, the neural network needs to relearn a new image to be recognized. To do so, a process of labeling, annotating, and tagging additional data to be learned by the neural network is required.

In an embodiment of the disclosure, instead of having to perform such a cumbersome process, the image detection apparatus 110 may easily update an original neural network by receiving a new model from the computing device 130 via the communication network 120.

The image detection apparatus 110 may detect an additional information area having style information different from the first style information by using the updated neural network. In the above example, when a content provider changes a style of an additional information area to the same style as that of the second additional information area 153 of FIG. 1, the image detection apparatus 110 may detect the second additional information area 153 having the second style information in a second image 150 currently being output by using the updated neural network.

As described above, according to an embodiment of the disclosure, the image detection apparatus 110 may obtain style information of a detected additional information area and use the style information as training data.

According to an embodiment of the disclosure, even when a style of an additional information area to be detected is changed, the image detection apparatus 110 may detect the additional information area by using the updated neural network without additional learning.

FIG. 2 is a block diagram of an image detection apparatus 200 according to an embodiment of the disclosure.

Referring to FIG. 2, the image detection apparatus 200 may include a processor 210, a memory 220, and a display 230.

In an embodiment of the disclosure, the image detection apparatus 200 may be an electronic device capable of detecting an additional information area in an image and generating training data for detecting a new additional information area based on the detected additional information area.

According to an embodiment of the disclosure, the display 230 may display, on a screen, pieces of content provided by content providers. The display 230 may output, on a screen, a broadcasting program received in real-time or a program for a VOD service, which is received through streaming or downloading In an embodiment of the disclosure, the display 230 may output, in response to a user's request to change a channel, content from the new channel simultaneously with an additional information area corresponding to the content for a certain time.

When the display 230 is configured as a touchscreen, the display 230 may be used as an input device such as a user interface as well as an output device. For example, the display 230 may include at least one of a liquid crystal display (LCD), a thin film transistor (TFT)-LCD, an organic light-emitting diode (OLED) display, a flexible display, a three-dimensional (3D) display, or an electrophoretic display. The image detection apparatus 200 may include two or more displays 230 according to its implemented configuration.

According to an embodiment of the disclosure, the memory 220 may store at least one instruction. The memory 220 may store at least one program executed by the processor 210. At least one neural network and/or predefined operation rules or an AI model may also be stored in the memory 220. In addition, the memory 220 may store data input to or output from the image detection apparatus 200.

In an embodiment of the disclosure, the memory 220 may store information about an additional information area detected by the image detection apparatus 200.

The memory 220 may include at least one type of storage media, i.e., at least one of a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, or an optical disc.

The processor 210 controls all operations of the image detection apparatus 200. The processor 210 may control the image detection apparatus 200 to perform a function by executing at least one instruction stored in the memory 220.

In an embodiment of the disclosure, the image detection apparatus 200 may use AI technology. AI technology consists of machine learning (deep learning) and element technologies using the machine learning. AI technology may be implemented using algorithms. In this case, an algorithm or a set of algorithms for implementing AI technology is called a neural network. A neural network may receive input data, perform computations on the input data for analysis and classification, and output resulting data. A neural network needs to be trained to accurately output the resulting data corresponding to the input data as described above. In this case, 'training' may mean training a neural network such that the neural network may discover or learn on its own a method of analyzing various pieces of data input to the neural network, a method of classifying the input pieces of data, and/or a method of extracting, from the input pieces of data, features necessary for generating resulting data. Training a neural network may mean that an AI model with desired characteristics is created by applying a learning algorithm to a large amount of training data. Such training may be performed by the image detection apparatus 200 itself where AI is performed according to an embodiment of the disclosure, or through a separate server/system.

In this case, the learning algorithm is a method of training a target device (e.g., a robot) with a large amount of training data so that the target device may make decisions or predictions on its own. Examples of learning algorithms may include supervised learning, unsupervised learning, semi-supervised learning, and reinforcement learning, and the learning algorithms according to embodiments of the disclosure are not limited to the above-described example except where otherwise clearly indicated.

A set of algorithms designed to generate output data corresponding to input data via a neural network, software for performing the set of algorithms, and/or hardware for executing the set of algorithms are collectively referred to as an 'AI model'.

The processor 210 may process input data according to predefined operation rules or an AI model. The predefined operation rules or AI model may be created using a particular algorithm. In addition, the AI model may be created by training a particular algorithm. The processor 210 may generate output data corresponding to the input data via the AI model.

In an embodiment of the disclosure, the processor 210 may store at least one AI model. In an embodiment of the disclosure, the processor 210 may generate output data from input images by using a plurality of AI models. In an embodiment of the disclosure, the memory 220 rather than the processor 210 may store the AI models.

In an embodiment of the disclosure, a neural network used by the processor 210 may be a neural network trained to detect multiple classes in an image. An image output by the display 230 may further include, in addition to content output from a corresponding channel, one or more classes from among a thumbnail area, a logo area, and an additional information area. The thumbnail area may mean another image included in the image. The logo area may mean a visual design or the like for displaying the corresponding channel or program name or advertising a particular program or channel, a related product, etc. The thumbnail area or the logo area may be included in the additional information area or in the image separately from the additional information area.

The processor 210 may capture an image output on the display 230 for every certain time period and detect multiple classes in the captured image. The processor 210 may detect, in an image, classes having a shape or style that is the same as or similar to a previously learned one by using a neural network.

The processor 210 may detect an additional information area in the image. The processor 210 may detect, in the image, an additional information area having a shape or style that is the same as or similar to a previously learned one.

A text and a background other than the text, may be identified from the additional information area. The processor 210 may obtain text information from the additional information area. The text information may include a type of the text and location information thereof. To obtain the text information, the processor 210 may separate the additional information area from other classes and then detect edges and extract a feature map from the separated additional information area to thereby extract a text region included in the additional information area. The text region may be a box-shaped region including the text.

The processor 210 may recognize the text by performing optical character recognition (OCR) on the text region. Recognizing a text may mean recognizing, in a text region, at least one of a number, a word, a language of the word, or a font.

The processor 210 may classify a text into different classes. The text may be classified into at least one class, i.e., at least one of a channel name, a channel number, a title, a playback time, or other information. The processor 210 may store the text classified into different classes in the memory 220, together with a location of the text.

The processor 210 may obtain color information from an additional information area. The color information may be information representing color features of a text and a background of the additional information area. The color features may include a color, a texture, transparency, etc.

The color information may include at least one of a color feature of the entire additional information area, a color feature of a background, a color feature of a text, or a relative color feature such as the degree of contrast in color, texture, or transparency between the background and the text.

The processor 210 may obtain style information by combining text information with color information. Style information may include at least one of a location or arrangement of an additional information area in an image, a color of a background in the additional information area, a texture of the background, transparency of the background, a color histogram of the background, a layout of texts in the additional information area, a type of each text, a font of each text, a color of each text, a texture of each text, a transparency of each text, or a color histogram of each text.

The processor 210 may detect an additional information area having a new style, which is included in the image, by using a model that has learned an additional information area having new style information generated based on the obtained style information.

In an embodiment of the disclosure, the processor 210 may control the above-described operations to be performed by executing one or more instructions stored in the memory 220. In this case, the memory 220 may store one or more instructions executable by the processor 210.

In an embodiment of the disclosure, the processor 210 may store one or more instructions in a memory provided therein and control the above-described operations to be performed by executing the one or more instructions stored in the memory. In other words, the processor 210 may perform a certain operation by executing at least one instruction or program stored in the memory 220 or an internal memory provided in the processor 210.

Figure 3:
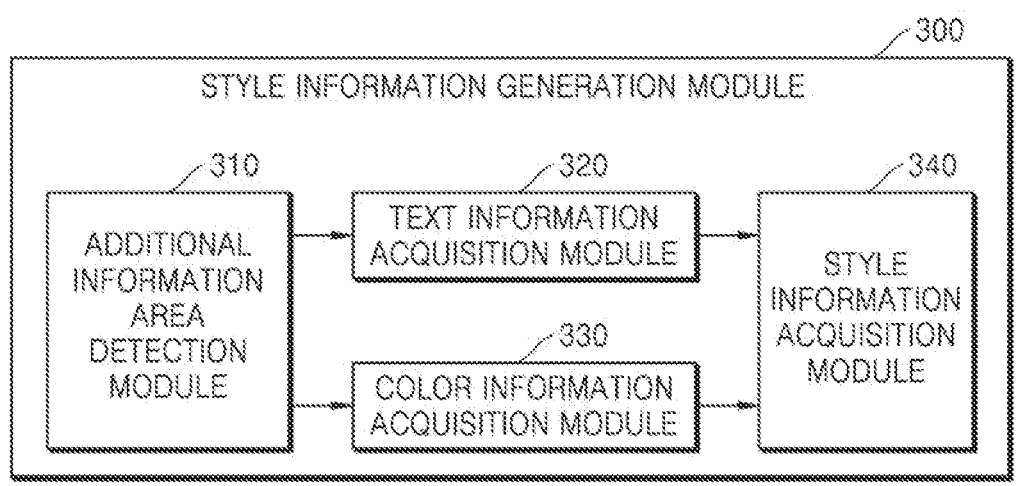
FIG. 3 is a block diagram illustrating a style information generation module that performs a function of an image detection apparatus obtaining style information from an image output on a screen, according to an embodiment of the disclosure.

FIG. 3 is a block diagram illustrating a style information generation module 300 that performs a function of the image detection apparatus 110 obtaining style information from an image output on a screen, according to an embodiment of the disclosure.

Referring to FIG. 3, the style information generation module 300 may include an additional information area detection module 310, a text information acquisition module 320, a color information acquisition module 330, and a style information acquisition module 340.

The style information generation module 300 may receive a captured image of a screen output on a display, detect or identify an additional information area in the received image, and obtain style information of the detected additional information area.

The additional information area detection module 310 may include an appropriate logic, circuit, interface, and/or code that may be operated to detect multiple classes in an input image. The additional information area detection module 310 may detect one or more classes from among content, a thumbnail area, a logo area, and an additional information area included in the input image.

The additional information area detection module 310 may detect an additional information area in an image by using a neural network. The additional information area detection module 310 may detect, in an image, an additional information area having the same or similar style as or to a previously learned style. The additional information area detection module 310 separates the detected additional information area from the image and transmit the separated additional information area to the text information acquisition module 320 and the color information acquisition module 330.

The text information acquisition module 320 may include an appropriate logic, circuit, interface, and/or code capable of obtaining text information from the additional information area. The text information acquisition module 320 may detect edges in the additional information area. The edges may include all edges of a text or noise.

After detecting the edges, the text information acquisition module 320 may remove noise included in the additional information area in a stepwise manner by applying image processing techniques such as adaptive thresholding, a morphology operation, etc., to the additional information area.

Adaptive thresholding is a technique for processing an image by assigning different values to pixels having values that are greater than or less than a threshold, and in particular, a technique for processing an image so that noise is minimized by applying different thresholds to different regions of the image. The text information acquisition module 320 may separate a background and a text by adaptively applying a threshold to each region of the additional information area.

The text information acquisition module 320 may perform a morphology operation after separating the background and text. The morphology operation is a technique used to remove noise and extract features. The text information acquisition module 320 may perform a morphology operation to remove noise from the additional information area and obtain a feature map representing features of the text in the additional information area. The feature map may have a form in which noise is removed from the additional information area.

The text information acquisition module 320 may perform horizontal and vertical profiling on the feature map. Edge information of the text is contained in edge information from which noisy edge information is filtered out. To identify a location of a text region, the text information acquisition module 320 may perform profiling on lines along a vertical axis to find a location where a component is present and perform a projection along a horizontal axis to detect a space and identify a word unit.

Thereafter, the text information acquisition module 320 may perform a connected component analysis. The text information acquisition module 320 may find connected pixels constituting an object, obtain a relationship between contours constituted by the pixels, distinguish different objects based on different colors, etc., and detect a region including a text. The region including the text, i.e., a text region, may be a region having a shape such as a circle, an oval, or a quadrangular box surrounding the text.

The text information acquisition module 320 may extract location information of the text region.

The text information acquisition module 320 may perform OCR on the text region to recognize at least one of whether the corresponding text is numbers or words, in the case where the text is words, a language of the words, or which font is used for the words. OCR is an automatic recognition technology that converts letters and images on a printed material or photo into digital data, and enables conversion of images of letters or numbers into a format such as a character code that is editable by a computer.

The text information acquisition module 320 may classify recognized words into different classes. The text information acquisition module 320 may extract meaningful information from the recognized words by using a context rule based on a dictionary and classify the corresponding text into different classes. The classes of text may include at least one of a channel name, a channel number, a title, a playback time, a title genre, a performer, or various other pieces of additional information.

Because the text information acquisition module 320 has location information of the text region, the text information acquisition module 320 may identify text that is detected at the location of the text region, and may obtain text information by classifying the recognized text for each location into different classes.

The color information acquisition module 330 may include an appropriate logic, circuit, interface, and/or code capable of performing a function of obtaining color information from an additional information area.

A text and a background other than the text, may be detected or identified from the additional information area. The color information acquisition module 330 may obtain color information of the text and background included in the additional information area. The color information may be information indicating color features of each of the text and the background and/or relative color features between the text and the background. The color information may include color histograms indicating color distributions of the text and background, color moments, color coherence vectors, etc. Furthermore, the color information may include information such as textures of the text and background, transparency of colors, etc. In addition, the color information may include characteristics such as a color distribution or color contrast of the text against the background.

The style information acquisition module 340 may include an appropriate logic, circuit, interface, and/or code capable of performing a function of obtaining style information from text information and color information. The style information acquisition module 340 may obtain style information by combining the text information obtained by the text information acquisition module 320 with the color information obtained by the color information acquisition module 330.

The style information is information indicating the overall look and feel of an additional information area in an image and characteristics of a style, and may include location information such as a location or arrangement of the additional information area in the image and a layout of texts in the additional information area. Furthermore, the style information may include feature information of a background in the additional information area, such as a color, transparency, and color histogram of the background.

In addition, the style information may include style feature information regarding each text, such as a type or font, color, texture, transparency, color histogram, etc., of the corresponding text included in the additional information area.

The style information acquisition module 340 may output a feature vector corresponding to one or more extracted features.

Figure 4:
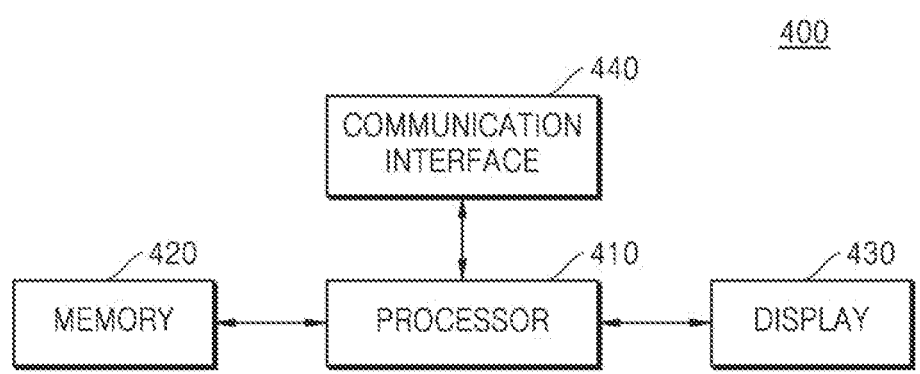
FIG. 4 is an internal block diagram of an image detection apparatus according to an embodiment of the disclosure.

FIG. 4 is an internal block diagram of an image detection apparatus 400 according to an embodiment of the disclosure.

The image detection apparatus 400 of FIG. 4 may include a processor 410, a memory 420, a display 430, and a communication interface 440. The image detection apparatus 400 of FIG. 4 may include the image detection apparatus 200 of FIG. 2. Hereinafter, the processor 410, the memory 420, and the display 430 of the image detection apparatus 400 in FIG. 4 may perform substantially the same functions as the processor 210, the memory 220, and the display 230 of the image detection apparatus 200 in FIG. 2, respectively, and thus, duplicate descriptions will be omitted below.

The processor 410 controls all operations of the image detection apparatus 400. The processor 410 may execute one or more instructions stored in the memory 420 to detect an additional information area in a first image output on the display 430 by using a neural network and obtain style information of the additional information area from the additional information area.

According to an embodiment of the disclosure, the communication interface 440 may transmit and receive signals by performing communication with an external device connected thereto via a wired or wireless network according to control by the processor 410. The communication interface 440 may include at least one communication module, such as a short-range communication module, a wired communication module, a mobile communication module, a broadcast receiving module, etc. Here, the at least one communication module may include a tuner for performing broadcast reception and a communication module capable of performing data transmission and reception via a network that conforms to communication standards such as Bluetooth, wireless local area network (WLAN) (or Wi-Fi), wireless broadband (Wibro), World Interoperability for Microwave Access (Wimax), code division multiple access (CDMA), wide-band CDMA (WCDMA), etc.

In an embodiment of the disclosure, the communication interface 440 may transmit or receive data to or from an external computing device.

The computing device may be an electronic device capable of receiving style information from the image detection apparatus 400 and generating new style information based on the received style information. The computing device may generate a new image by synthesizing an additional information area having new style information with general content and train a model to detect the additional information area from the new image. The computing device may transmit the trained model to the image detection apparatus 400 via the communication interface 440.

In an embodiment of the disclosure, the communication interface 440 may receive the trained model from the computing device. The processor 410 may update the neural network by using the received model. Subsequently, when a second image is output on the display 430 the processor 410, the processor 410 may detect, in the second image, an additional information area having style information different from previous style information by using the updated neural network.

Figure 5:
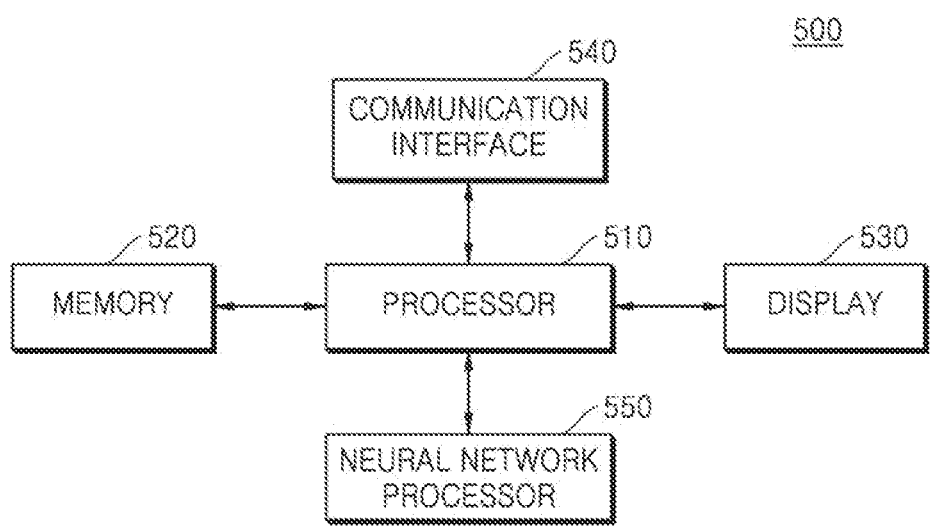
FIG. 5 is an internal block diagram of an image detection apparatus according to an embodiment of the disclosure.

FIG. 5 is an internal block diagram of an image detection apparatus 500 according to an embodiment of the disclosure.

Referring to FIG. 5, the image detection apparatus 500 may include a processor 510, a memory 520, a display 530, a communication interface 540, and a neural network processor 550.

The processor 510, the memory 520, the display 530, and the communication interface 540 of the image detection apparatus 500 in FIG. 5 may perform substantially the same functions as the processor 410, the memory 420, the display 430, and the communication interface 440 of the image detection apparatus 400 in FIG. 4, respectively, and therefore duplicate descriptions will be omitted here.

The image detection apparatus 500 of FIG. 5 may further include the neural network processor 550 in comparison to the image detection apparatus 400 described with reference to FIG. 4. In other words, in the image detection apparatus 500 of FIG. 5, the neural network processor 550 may perform a function performed by a computing device, unlike in the image detection apparatus 400 of FIG. 4.

The processor 510 controls all operations of the image detection apparatus 500. The processor 510 may execute one or more instructions stored in the memory 520 to control the image detection apparatus 500 to function.

In an embodiment of the disclosure, the neural network processor 550 may perform computations via a neural network. For example, the neural network processor 550 may be implemented by any one or any combination of a machine learning accelerator, a graphics processing unit (GPU), a field-programmable gate array (FPGA), an application-specific integrated circuit (ASIC), and a central processing unit (CPU). The neural network processor 550 may execute one or more instructions to perform computations via the neural network.

The neural network processor 550 may generate new style information by using first style information obtained by the processor 510 as training data. The neural network processor 550 may obtain style properties of the additional information area from the first style information. The neural network processor 550 may obtain pieces of information starting from overall information up to detailed information by using the obtained style properties and generate an image with new style properties by synthesizing the pieces of information.

The neural network processor 550 may generate an entire image by synthesizing an image of an additional information area having a new style with a general content area, and train a model by using the entire image as new training data for the model.

The processor 510 may update a previously used neural network with a learning model generated by the neural network processor 550. By using the updated neural network, the processor 510 may detect an additional information area having second style information in a second image including the additional information area having the second style information different from the first style information.

Alternatively, the neural network processor 550 may perform a function of detecting an additional information area of a new style in an image by using a learning model.

Figure 6:
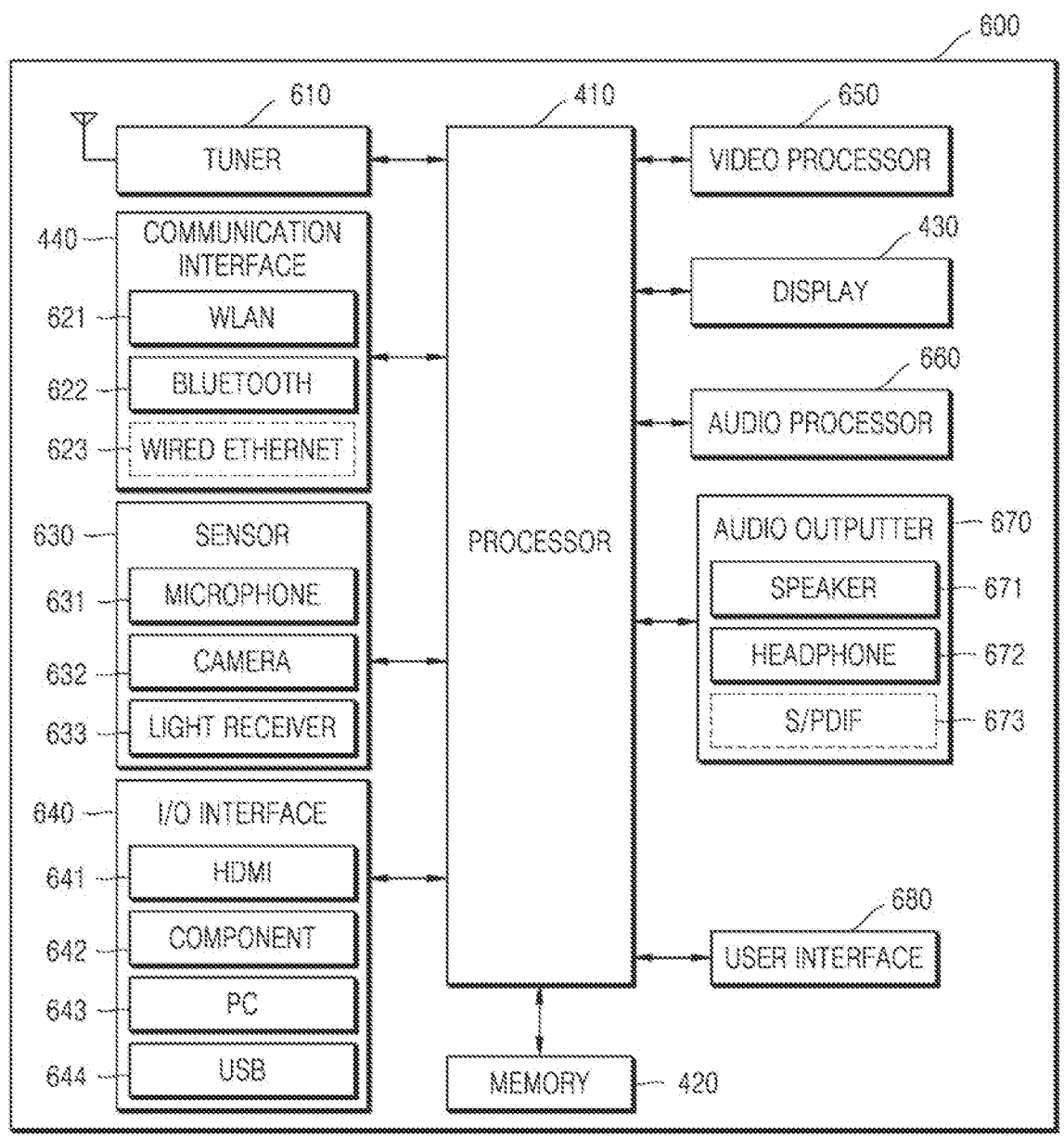
FIG. 6 is an internal block diagram of an image detection apparatus according to an embodiment of the disclosure.

FIG. 6 is an internal block diagram of an image detection apparatus 600 according to an embodiment of the disclosure. Referring to FIG. 6, the image detection apparatus 600 may further include, in addition to a controller 410, a memory 420, a display 430, and a communication interface 440, a tuner 610, a sensor 630, an input/output (I/O) interface 640, a video processor 650, an audio processor 660, an audio outputter 670, and a user interface 680.

The image detection apparatus 600 of FIG. 6 may include components of the image detection apparatus 400 described with reference to FIG. 4. Accordingly, descriptions of the controller 410, the memory 420, the display 430, and the communication interface 440, which are already provided above with respect to FIG. 4, will be omitted here. In addition, although with reference to FIG. 6 the term "controller 410" is used instead of the processor 410, the controller 410 of FIG. 6 may perform the same function as the processor 410 of FIG. 4, and thus the same reference numeral 410 is used.

By performing amplification, mixing, resonance, etc. of a broadcast signal received in a wired or wireless manner, the tuner 610 may tune and then select only a frequency of a channel that is to be received by the image detection apparatus 600 from among many radio wave components. A broadcast signal received via the tuner 610 undergoes decoding (e.g., audio decoding, video decoding, or additional information decoding) to be separated into audio, video and/or additional information. The audio, video, and/or additional information may be stored in the memory 420 according to control by the controller 410.

The communication interface 440 may connect the image detection apparatus 600 to an external device or server according to control by the controller 410. Through the communication interface 440, the image detection apparatus 600 may download a program or an application needed by the image detection apparatus 600 from an external device or server, or browse the web. In an embodiment of the disclosure, the communication interface 440 may transmit style information obtained by the controller 410 to an external computing device, and receive a neural network model that has learned new data from the computing device.

The communication interface 440 may include one of a WLAN 621, a Bluetooth module 622, and a wired Ethernet 623. Furthermore, the communication interface 440 may include a combination of the WLAN 621, the Bluetooth communication module 622, and the wired Ethernet 623. The communication interface 440 may also receive a control signal from a control device (not shown) such as a remote controller according to control by the controller 410. The control signal may be implemented in the form of a Bluetooth signal, a radio frequency (RF) signal, or a Wi-Fi signal. The communication interface 440 may further include, in addition to the Bluetooth module 622, other short-range communication modules (e.g., near field communication (NFC) module (not shown) and a Bluetooth Low Energy (BLE) module (not shown)). According to an embodiment of the disclosure, the communication interface 440 may exchange a connection signal with an external device, etc., via a short-range communication module such as the Bluetooth module 622 or the BLE module.

The sensor 630 detects a user's voice, images, or interactions and may include a microphone 631, a camera 632, and a light receiver 633. The microphone 631 may receive a voice uttered by the user, convert the received voice into an electrical signal, and output the electrical signal to the controller 410.

The camera 632 may include a sensor (not shown) and a lens (not shown) and capture an image formed on a screen.

The light receiver 633 may receive an optical signal (including a control signal). The light receiver 633 may receive an optical signal corresponding to a user input (e.g., touching, pressing, touch gesture, voice, or motion) from a control device (not shown) such as a remote controller or mobile phone. A control signal may be extracted from the received optical signal according to control by the controller 410.

The I/O interface 640 may receive, according to control by the controller 410, video (e.g., a moving image signal, a still image signal, etc.), audio (e.g., a voice signal, a music signal, etc.), additional information (e.g., a description of content, a content title, and a content storage location), etc., from an external database or server provided by content providers. In this case, the additional information may include metadata about the content.

The I/O interface 640 may include one of a high-definition multimedia interface (HDMI) port 641, a component jack 642, a PC port 643, and a universal serial bus (USB) port 644. The I/O interface 640 may include a combination of the HDMI port 641, the component jack 642, the PC port 643, and the USB port 644.

The video processor 650 may process image data to be displayed by the display 430 and perform various types of image processing, such as decoding, rendering, scaling, noise filtering, frame rate conversion, and resolution conversion, on the video data.

The audio processor 660 processes audio data. The audio processor 660 may perform various types of processing, such as decoding, amplification, noise filtering, etc., on the audio data.

The audio outputter 670 may output, according to control by the controller 410, audio contained in content received via the tuner 610, audio input via the communication interface 440 or the I/O interface 640, and audio stored in the memory 420. The audio outputter 670 may include at least one of a speaker 671, a headphone output terminal 672, or a Sony/Phillips Digital Interface (S/PDIF) output terminal 673.

According to an embodiment of the disclosure, the user interface 680 may receive a user input for controlling the image detection apparatus 600. The user interface 680 may include, but is not limited to, various types of input devices consisting of a touch panel for sensing a user's touch, a button for receiving a user's push manipulation, a wheel for receiving a user's rotation manipulation, a keyboard, a dome switch, a microphone for speech recognition, a motion detection sensor for sensing a motion, etc. In addition, when the image detection apparatus 600 is manipulated by a remote controller (not shown), the user interface 680 may receive a control signal received from the remote controller.

According to an embodiment of the disclosure, the user may control the image detection apparatus 600 via the user interface 680 so that various functions of the image detection apparatus 600 may be performed. The user may select particular content or change a channel via the user interface 680 of the image detection apparatus 600.

Figure 7:
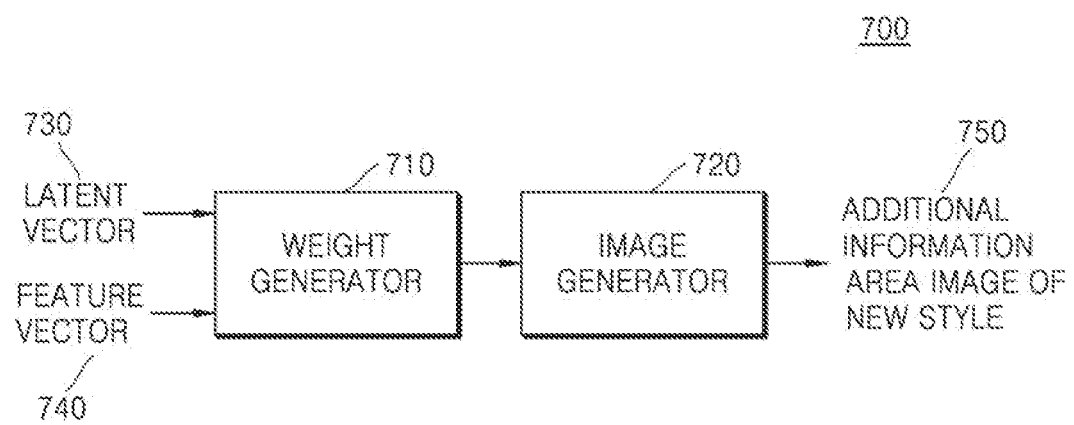
FIG. 7 is a diagram illustrating an image generative model for generating an additional information area having new style information by using style information of the additional information area, according to an embodiment of the disclosure.

FIG. 7 is a diagram illustrating an image generative model 700 for generating an additional information area having new style information by using style information of the additional information area, according to an embodiment of the disclosure.

In an embodiment of the disclosure, the image generative model 700 of FIG. 7 may be included in the computing device 130 of FIG. 1 or the neural network processor 550 of FIG. 5.

Referring to FIG. 7, the image generative model 700 may include a weight generator 710 and an image generator 720.

In an embodiment of the disclosure, the image generative model 700 may be a style-based generative adversarial network (GAN). A style-based GAN is a model that considers an image as a combination of styles and synthesizes images by applying style information at each layer of a generator.

Referring to FIG. 7, the weight generator 710 may receive a latent vector 730 and a feature vector 740. The latent vector 730 is simply a value randomly sampled from a uniform distribution or a normal distribution. A space in which latent vectors lie is called a latent space. The size of the latent space may be arbitrarily determined, and for example, the latent space may be determined to be 100 dimensional. There is no limit on the size of the latent space, but the latent space has to be large enough to contain sufficient information of an object to be represented.

The feature vector 740 may be a vector corresponding to style information obtained by the image detection apparatus 110.

The weight generator 710 may include a mapping network. The mapping network is non-linear, and may reduce a biased correlation between features. The mapping network may include a plurality of layers. Each layer may be represented as at least one node, and nodes between layers are connected by edges. Nodes may be fully connected to nodes included in previous and subsequent layers.

The weight generator 710 may obtain an intermediate vector by passing input information through the mapping network. The intermediate vector may be a weight containing style features. The weight generator 710 may obtain a weight having style features corresponding to the feature vector 740 by concatenating the latent vector 730 with the feature vector 740. For example, when the feature vector 740 extracted from the style information is related to features corresponding to color information indicating black, the weight generator 710 may generate an intermediate vector containing the features corresponding to the color information of black. As another example, when the feature vector 740 extracted from the style information is related to features corresponding to edge information representing contours of a text having a particular font, the weight generator 710 may generate an intermediate vector containing the features corresponding to the edge information of the contours.

The weight generator 710 transmits the generated intermediate vector to the image generator 720.

The image generator 720 is a model that includes a plurality of layers and synthesizes an image by applying style information at each of the layers.

The image generator 720 may receive a tensor. A tensor may be a data structure containing information about a deep learning model. A tensor is a base image in which styles of training data are not reflected, and may be information representing an average image. In an embodiment of the disclosure, a tensor may be a layout of an additional information area having a basic style.

The image generator 720 may include a plurality of layers starting from a tensor of 4×4×512 and ending with a layer of 1024×1024×3. Each layer may be connected to a next layer through convolution and upsampling. The image generator 720 may apply a style via Adaptive Instance Normalization (AdaIN) after each convolutional layer.

An intermediate vector, i.e., a weight, is input to the image generator 720 and may be learned to represent styles for all of the layers included in the image generator 720. A weight may be input to each of the layers in the image generator 720. A shallower layer may extract lower-level features of the image, i.e., coarse features, whereas a deeper layer may extract detailed higher-level features.

The image generator 720 may obtain a resulting image by appropriately combining features obtained from a low level to a high level. The resulting image may be an additional information area image 750 of a new style. The image generator 720 may generate more detailed and diverse images by adding random noise at each layer.

As described above, according to an embodiment of the disclosure, the computing device 130 or the neural network processor 550 may use an image generative model to generate an additional information area having new style information by using style information obtained by the image detection apparatus 110 as training data.

Figure 8:
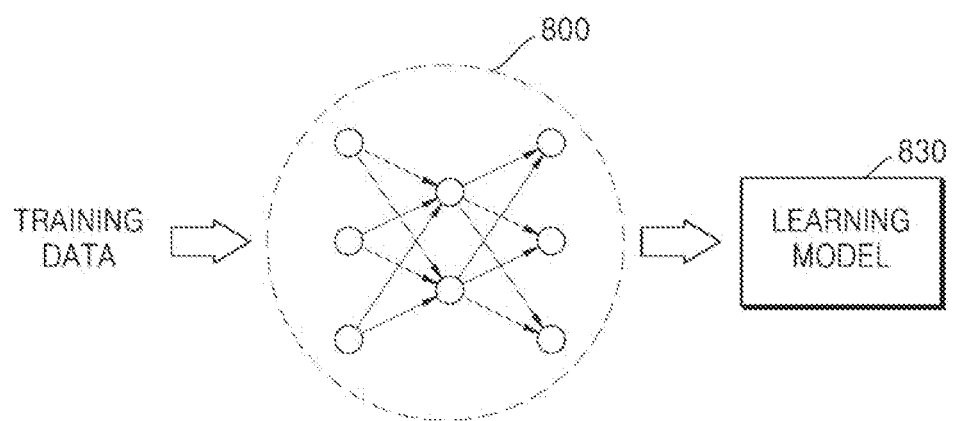
FIG. 8 is a diagram for explaining an operation of a neural network learning a method of detecting an additional information area from input data, according to an embodiment of the disclosure.

FIG. 8 is a diagram for explaining an operation of a neural network 800 learning a method of detecting an additional information area from input data, according to an embodiment of the disclosure.

Referring to FIG. 8, the neural network 800 may obtain training data and generate a learning model 830 by using the training data as an input value. The neural network 800 may learn a method of detecting an additional information area from a plurality of pieces of training data in response to input of the training data, and generate the learning model 830 based on a result of the learning.

In an embodiment of the disclosure, the training data may include images of additional information areas or the like which are provided by various content providers and output together with content when a channel is changed.

Furthermore, in an embodiment of the disclosure, the training data may be generated using style information obtained by the image detection apparatus 110. For example, the training data may be obtained from an image obtained by using an additional information area having new style information, which is generated by the image generative model 700 described with reference to FIG. 7.

The additional information area having new style information may be combined with a general content area to generate a single image. The neural network 800 may use an image including an additional information area of a new style as training data.

In an embodiment of the disclosure, the training data may include images generated by including, together with content, corresponding additional information areas having various new styles generated based on a plurality of pieces of style information obtained from a plurality of image detection apparatuses.

In this case, the learning model 830 may be a trained neural network itself that provides a desired result via the neural network 800. In detail, in order to detect an additional information area, a plurality of weight values to be respectively applied to nodes in the neural network 800 may be set by training the neural network 800 based on a plurality of training images. In this case, a weight may refer to a strength of connection between nodes in the neural network 800. Weight values may be optimized via iterative learning, and may be modified repeatedly until the accuracy of a result satisfies a preset reliability. The learning model 830 may be a neural network formed by finally set weight values.

According to some embodiments of the disclosure, an operation of learning a method of detecting an additional information area in an image by using one or more neural networks 800 may be performed in advance. Furthermore, as some of the training images are changed, the learning model 830 may be updated. In other words, as the user views content through the image detection apparatus 110, an image having new style information generated based on style information of additional information area extracted from the viewed content may be used as a training image. In addition, a new training image may be used for every certain time period. When a new training image is added, the one or more neural networks 800 may relearn a method of detecting an additional information area in an image, and accordingly, the learning model may be updated.

An operation of learning a method of detecting an additional information area in an image by using the one or more neural networks 800 may be performed by the computing device 130. For example, an operation of learning a method of detecting an additional information area in an image by using the one or more neural networks 800 may require relatively complicated computations. Thus, the external computing device 130 may perform a learning operation, and the image detection apparatus 110 may receive the learning model 830 from the external computing device 130, thereby reducing the number of computations required to be performed by the image detection apparatus 110. The image detection apparatus 110 may receive the learning model 830 from an external server to store it in a memory and detect an additional information area in an image by using the stored learning model 830.

Furthermore, in another embodiment of the disclosure, the image detection apparatus 500 of FIG. 5 may include the neural network processor 550 which is a separate dedicated processor for performing a learning operation via the neural network 800. In addition, the neural network processor 550 may determine the learning model 830 by performing learning via the neural network 800, and detect an additional information area via the determined learning model 830.

Figure 9:
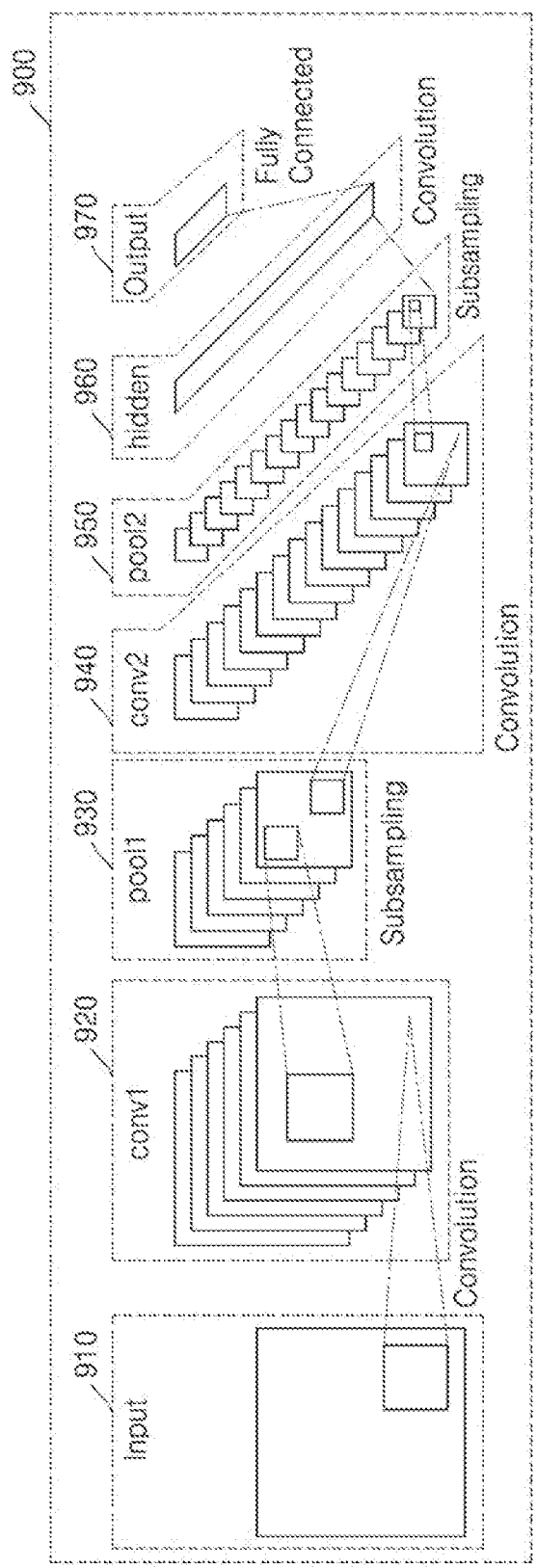
FIG. 9 is a diagram for explaining a neural network that performs detection of an additional information area, according to an embodiment of the disclosure.

FIG. 9 is a diagram for explaining a neural network 900 that performs detection of an additional information area, according to an embodiment of the disclosure. FIG. 9 illustrates a neural network used in an embodiment of the disclosure.

The computing device 130 or the neural network processor 550 may generate output data by using a convolution neural network (CNN), a deep CNN (DCNN), a Capsule network (Capsnet) neural network (not shown), or the like. A DCNN and a Capsnet may also be CNN-based neural networks.

When a correlation between information included in an image is local, a CNN-based neural network introduces the concept of a filter that considers only a particular local region, and may generate output data by perform a convolution operation on pieces of information in the filter.

FIG. 9 shows a CNN-based neural network 900. In detail, FIG. 9 illustrates a DCNN 900 having a plurality of depths by including a plurality of layers. The computing device 130 may recognize an additional information area in an image as an object via the CNN-based neural network 900 and output a result of the recognition.

In an embodiment of the disclosure, an image including an additional information area having new style information may be input to an input layer 910 of the CNN-based neural network 900. In the CNN-based neural network 900, convolution layers and pooling layers are alternately arranged, and a depth of a filter in each layer increases from left to right. In addition, fully connected layers may be formed as final layers of the CNN-based neural network 900.

In addition, a convolution layer is a layer for data generated according to a convolution operation, and a pooling layer is a layer for reducing the number or size of data via subsampling or a pooling operation. Pieces of data representing features of an input image are generated as they passes through a convolution layer and a pooling layer. In addition, resulting data for an object recognized from features may be output via a hidden layer formed as a fully connected layer by taking, as input, the pieces of data generated by passing through the convolutional layer and the pooling layer.

For example, the CNN-based neural network 900 may include an input layer 910, a first convolution layer 920, a first pooling layer 930, and a second convolution layer 940, a second pooling layer 950, a hidden layer 960, and an output layer 970. In this case, a depth of a convolutional layer and a pooling layer may vary, and a depth of a hidden layer may also vary. Furthermore, as the depth of the convolutional layer and the pooling layer increases, more accurate output data may be obtained. This is because, as the depth of the convolutional layer and the pooling layer increases, information representing features of an input image becomes more detailed, and thus, an object to be recognized from the features may be recognized more accurately. In addition, a depth and shape of the CNN-based neural network 900 may be designed in various ways by taking into account the accuracy of and reliability of a result and a processing speed and capacity of a processor.

Figure 10:
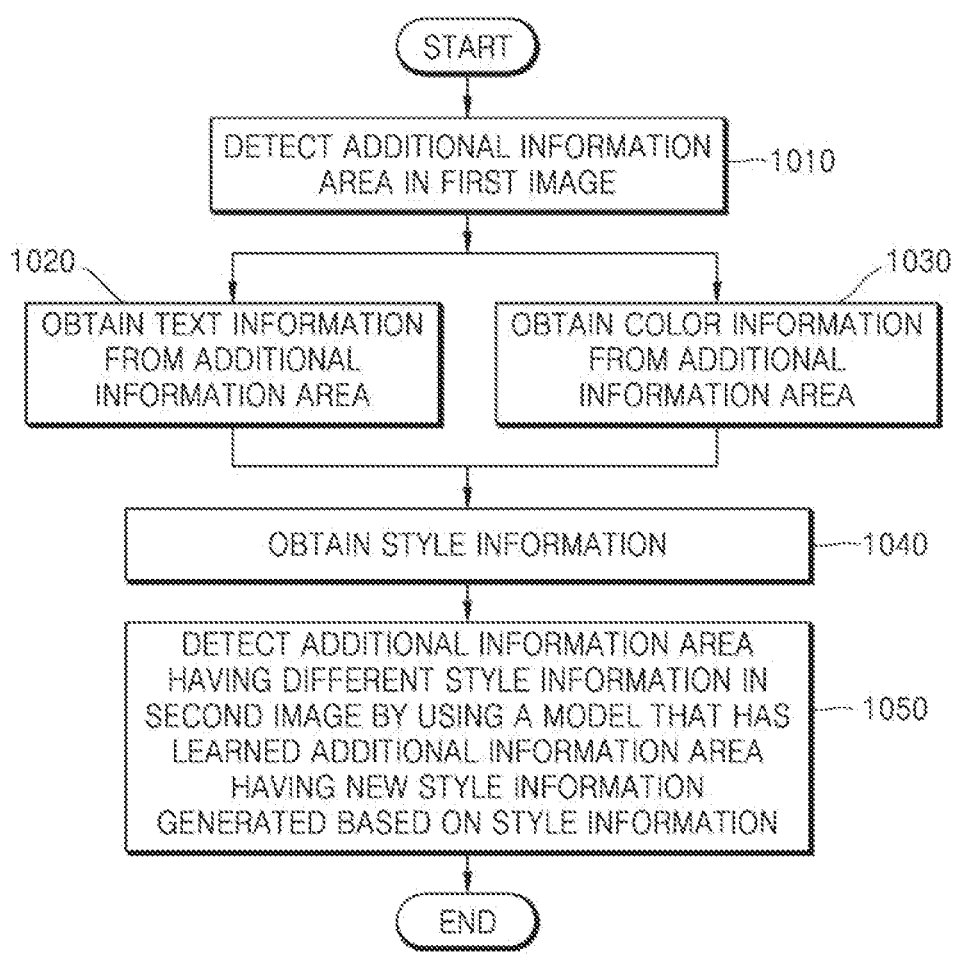
FIG. 10 is a flowchart of a method of obtaining style information, according to an embodiment of the disclosure.

FIG. 10 is a flowchart of a method of obtaining style information, according to an embodiment of the disclosure.

Referring to FIG. 10, the image detection apparatus 110 may capture a first image output on a display and detect an additional information area in the captured first image (operation 1010).

An image output on a screen may include one or more classes from among a thumbnail area, a logo area, and an additional information area. The image detection apparatus 110 may detect, in an image, classes having a shape or style that is the same as or similar to a previously learned one by using a neural network trained to classify the image into multiple classes.

The image detection apparatus 110 may separate the additional information area from other classes and then extract a text region from the separated additional information area. The image detection apparatus 110 may recognize a number, a word, a language of the word, a font, etc., by performing OCR on the text region. The image detection apparatus 110 may classify the recognize text into different classes. The classes of the text may include at least one of a channel name, a channel number, a title, a playback time, or other information. The image detection apparatus 110 may obtain text information including a type and a location of a recognized text (operation 1020).

The image detection apparatus 110 may obtain color information from the additional information area (operation 1030). A text and a background other than the text, may be detected or identified from the additional information area. The color information may be information representing color or style features of the text and background.

The image detection apparatus 110 may obtain style information by combining the text information with the color information (operation 1040). Style information may include at least one of a location or arrangement of an additional information area in an image, a color of a background in the additional information area, a texture of the background, transparency of the background, a color histogram of the background, a layout of texts in the additional information area, a type of each text, a font of each text, a color of each text, a texture of each text, transparency of each text, or a color histogram of each text.

The obtained style information may be used as input data for an image generative model. The image generative model may receive style information and extract features therefrom. The image generative model may generate an additional information area image having a new style by using the extracted features.

An additional information area image having a new style generated by the image generative model may be combined with a general content image to form a complete image. The complete image may be used as training data for a neural network to train a model for detecting an additional information area.

The image detection apparatus 110 may detect, in a second image including an additional information area having style information different from that of the first image, the additional information area having the different style information by using the trained model.

Figure 11:
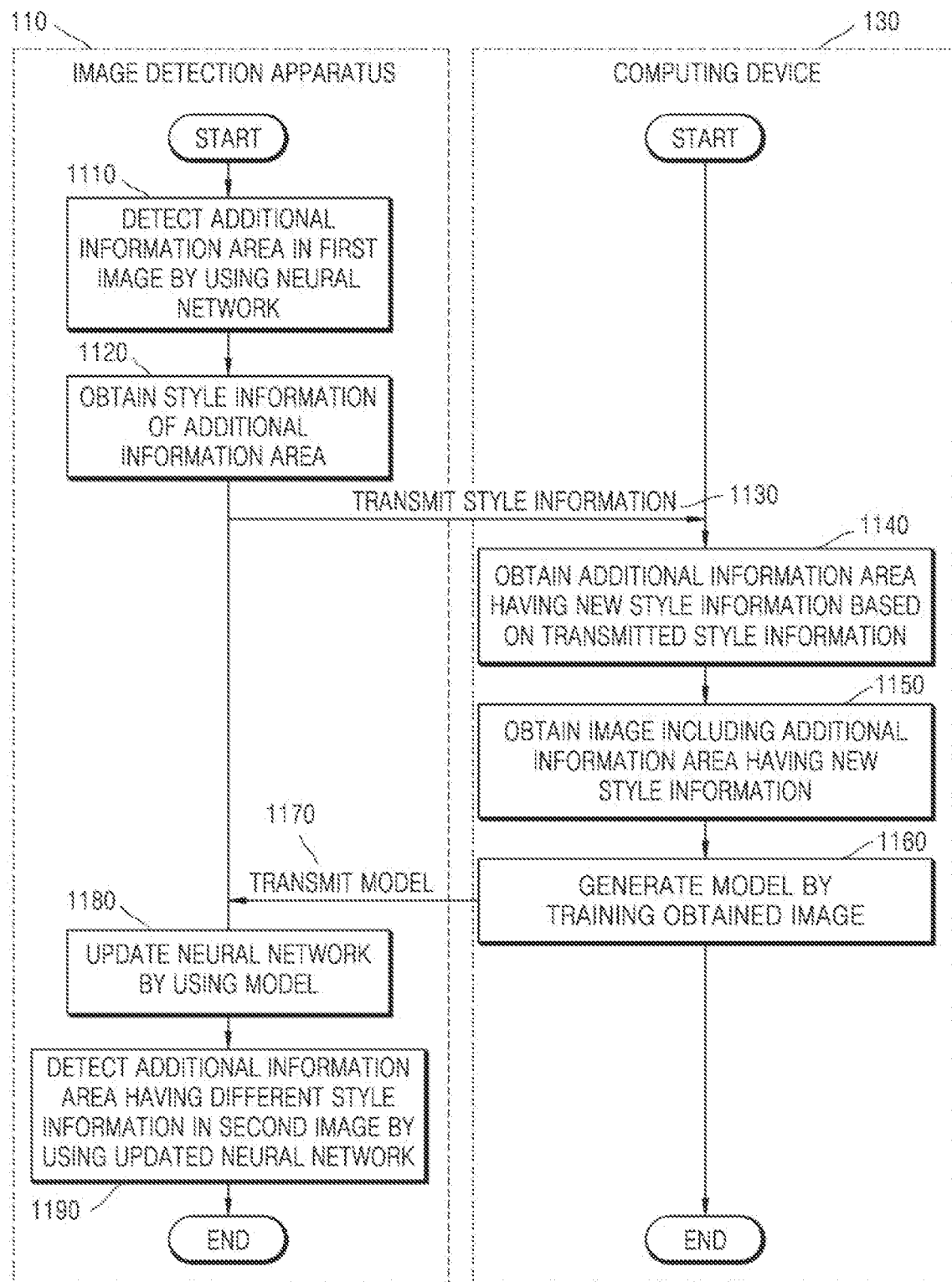
FIG. 11 is a flowchart of a method, performed by an image detection apparatus, of detecting an additional information area by receiving a model from a computing device, according to an embodiment of the disclosure.

FIG. 11 is a flowchart of a method, performed by the image detection apparatus 110, of detecting an additional information area by receiving a model from the computing device 130, according to an embodiment of the disclosure.

Referring to FIG. 11, the image detection apparatus 110 may detect an additional information area in a first image by using a neural network (operation 1110).

The image detection apparatus 110 may obtain text information and color information from the additional information area, and obtain style information of the additional information area (operation 1120). The image detection apparatus 110 may transmit the obtained style information to the computing device 130 (operation 1130).

The computing device 130 may generate a new image from an input image by using at least one neural network. The computing device 130 may obtain an additional information area image having new style information based on the style information transmitted by the image detection apparatus 110 (operation 1140). In an embodiment of the disclosure, the computing device 130 may generate a new image by using a Style-based GAN. The computing device 130 may obtain an intermediate vector containing style features by passing a feature vector corresponding to style information through a mapping network. The computing device 130 may input the intermediate vector to each of layers from a low level to a high level and obtain different features from each layer. The computing device 130 may obtain an additional information area image having new style information by appropriately combining features obtained at each level.

The computing device 130 may obtain an image in a form to be output by the image detection apparatus 110 by combining the additional information area having the new style information with a general content area (operation 1150).

The computing device 130 may use the generated image as training data for a model by using at least one neural network. The computing device 130 may train a model in such a manner as to receive the generated image as training data, extract features by classifying and analyzing input images, and detect an additional information area in an image based on the extracted features (operation 1160).

The computing device 130 may transmit the trained model to the image detection apparatus 110 (operation 1170).

The image detection apparatus 110 may receive a trained model from the computing device 130 for every certain time period or each time the computing device 130 newly trains a model.

The image detection apparatus 110 may update a previously used neural network by using the trained model received from the computing device 130 (operation 1180).

Subsequently, when a second image having an additional information area of a style that is different from that of the first image is input, the image detection apparatus 110 may detect an additional information area having different style information in the second image by using the updated neural network (operation 1190).

Figure 12:
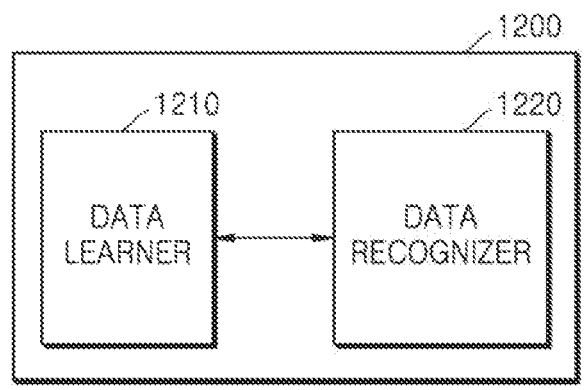
FIG. 12 is a block diagram of a configuration of a computing device according to an embodiment of the disclosure.

FIG. 12 is a block diagram of a configuration of a computing device 1200 according to an embodiment of the disclosure.

Referring to FIG. 1, the computing device 1200 may include a data learner 1210 and a data recognizer 1220.

The data learner 1210 may learn a criterion for recognizing an additional information area from an image. The data learner 1210 may learn a criterion with respect to which information of the image will be used to detect the additional information area in the image. Furthermore, the data learner 1210 may learn a criterion for how to recognize the additional information area by using information of the image. The data learner 1210 may obtain data to be used for training and apply the obtained data to a data recognition model to be described below. The data learner 1210 may use an image including an additional information area having certain style information as data to be used for training. The data learner 1210 may learn criteria for detecting features, a location, arrangement, etc., of an additional information area in an image.

The data recognizer 1220 may recognize classes of an additional information area or the like from an image according to a learned preset criterion, and output a recognition result. The data recognizer 1220 may recognize the additional information area from an image by using a trained data recognition model. Furthermore, a resultant value output by the data recognition model that takes the image as an input value may be used to modify and refine the data recognition model.

At least one of the data learner 1210 or the data recognizer 1220 may be fabricated in the form of at least one hardware chip and be mounted in an electronic device. For example, at least one of the data learner 1210 or the data recognizer 1220 may be manufactured in the form of a dedicated hardware chip for AI or as part of an existing general-purpose processor (e.g., a central processing unit (CPU) or application processor (AP)) or dedicated graphics processor (e.g., a graphics processing unit (GPU)) and may be mounted in various electronic devices as described above.

In this case, the data learner 1210 and the data recognizer 1220 may be mounted in one electronic device, or be respectively mounted in different electronic devices. For example, one of the data learner 1210 and the data recognizer 1220 may be included in one electronic device while the other may be included in a server. Furthermore, the data learner 1210 and the data recognizer 1220 may communicate with each other via a wire or wirelessly such that information about a model built by the data learner 1210 may be provided to the data recognizer 1220 and data input to the data recognizer 1220 may be provided to the data learner 1210 as additional training data.

Moreover, at least one of the data learner 1210 or the data recognizer 1220 may be implemented as a software module. When the at least one of the data learner 1210 or the data recognizer 1220 is implemented as a software module (or a program module including instructions), the software module may be stored in non-transitory computer readable recording media. Furthermore, in this case, the at least one software module may be provided by an OS or application. Alternatively, some of the at least one software module may be provided by the OS while the rest thereof may be provided by the application.

Figure 13:
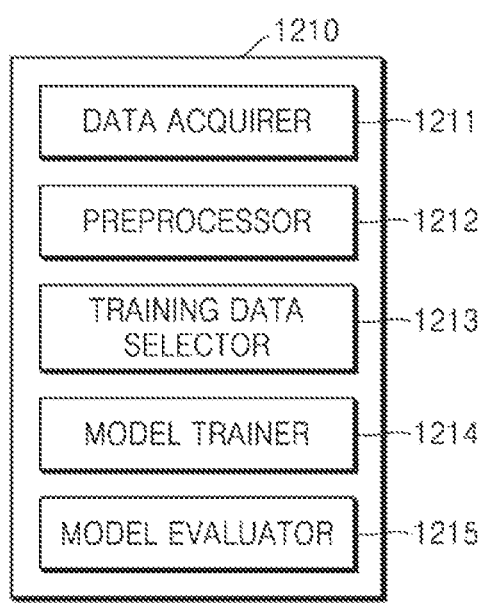
FIG. 13 is a block diagram of a data learner according to an embodiment of the disclosure.

FIG. 13 is a block diagram of the data learner 1210 according to an embodiment of the disclosure.

Referring to FIG. 13, according to an embodiment of the disclosure, the data learner 1210 may include a data acquirer 1211, a preprocessor 1212, a training data selector 1213, a model trainer 1214, and a model evaluator 1215.

The data acquirer 1211 may obtain data necessary for performing training to detect an additional information area in an image. The data acquirer 1211 may obtain data from a database or an external server, such as at least one social network server, a cloud server, etc., connected to the computing device 1200 through a network. The data acquirer 1211 may obtain data provided by content providers.

The preprocessor 1212 may preprocess the obtained data such that the obtained data may be used in training for detecting additional information in an image. The preprocessor 1212 may process, into a preset format, data obtained for learning to recognize an additional information area from an image so that the model trainer 1214 to be described later may use the obtained data. For example, the preprocessor 1212 may process data into a preset format, e.g., by removing redundant data from obtained data, removing data that is unlikely to be used from the obtained data, and vectorizing each data, but embodiments of the disclosure are not limited thereto.

The training data selector 1213 may select data necessary for training from among the preprocessed data. The selected data may be provided to the model trainer 1214. The training data selector 1213 may select data necessary for training from among the preprocessed data according to preset criteria for detecting additional information in an image.

Furthermore, the training data selector 1213 may select data according to preset criteria learned by the model trainer 1214 to be described later.

The model trainer 1214 may learn a criterion with respect to which training data needs to be used to detect additional information in an image. The model trainer 1214 may learn types, number, level, etc., of image attributes used for detecting additional information in an image.

Furthermore, the model trainer 1214 may train a data recognition model used to detect additional information in an image by using training data. In this case, the data recognition model may be a pre-built model. In this case, the data recognition model may be a model pre-built by receiving basic training data as input.

The data recognition model may be built by taking into account an application field of the data recognition model, an objective of learning, or a computer performance of a device. For example, the data recognition model may be a model based on a neural network. Models such as a deep neural network (DNN), a recurrent neural network (RNN), and a bidirectional recurrent DNN (BRDNN) may be used as the data recognition model, but are limited thereto.

According to various embodiments of the disclosure, when there are a plurality of pre-built data recognition models, the model trainer 1214 may determine a data recognition model having a high correlation between input training data and basic training data as a data recognition model to be trained. In this case, the basic training data may be pre-classified according to a type of data, and the data recognition model may be pre-built for each data type. For example, the basic training data may be pre-classified based on various criteria such as an area where the training data is generated, a time at which the training data is generated, a size of the training data, a genre of the training data, a creator of the training data, a type of an object in the training data, etc.

Furthermore, the model trainer 1214 may train a data recognition model by using, for example, a learning algorithm including error back-propagation or gradient descent.

Furthermore, the model trainer 1214 may train a data recognition model, for example, through supervised learning using training data as an input value. Furthermore, the model trainer 1214 may train a data recognition model, for example, via unsupervised learning that allows the data recognition model to discover a criterion for determining a user's status by self-learning types of data necessary for determining the user's status without any special guidance. Furthermore, the model trainer 1214 may train a data recognition model by using, for example, reinforcement learning exploiting feedback regarding whether a result of determining a user's status based on training is correct.

In addition, when the data recognition model is trained, the model trainer 1214 may store the trained data recognition model. In this case, the model trainer 1214 may store the trained data recognition model in a memory. Alternatively, the model trainer 1214 may store the trained data recognition model in a memory of a device including the data recognizer 1220 to be described later. Alternatively, the model trainer 1214 may store the trained data recognition model in a memory of a server connected via a wire or wirelessly to an electronic device.

In this case, the memory in which the trained data recognition model is stored may also store commands or data related to at least one other component of the device. Furthermore, the memory may also store software and/or programs. For example, the programs may include kernel, middleware, application programing interface (API) and/or application program (or "application").

The model evaluator 1215 may input evaluation data to the data recognition model and cause the model trainer 1214 to train again the data recognition model when a recognition result obtained from the evaluation data does not satisfy a preset criterion. In this case, the evaluation data may be preset data for evaluating the data recognition model.

For example, when the number or ratio of pieces of evaluation data with respect to which recognition results are not accurate from among recognition results output from the trained data recognition model with respect to evaluation data exceeds a preset threshold, the model evaluator 1215 may evaluate that the preset criterion is not satisfied. For example, when the preset criterion is defined as a ratio of 2%, and when the trained data recognition model outputs wrong recognition results with respect to more than 20 pieces of evaluation data among a total of 1000 pieces of evaluation data, the model evaluator 1215 may evaluate the trained data recognition model as not being suitable.

Moreover, when a plurality of trained data recognition models exist, the model evaluator 1215 may evaluate whether each of the trained data recognition model satisfies a preset criterion, and determine a trained data recognition model that has satisfied the preset criterion as a final data recognition model. In this case, when there are a plurality of data recognition models that has satisfied the preset criterion, the model evaluator 1215 may determine, as a final data recognition model, one or a certain number of data recognition models preset in order from highest to lowest evaluation score.

Moreover, at least one of the data acquirer 1211, the preprocessor 1212, the training data selector 1213, the model trainer 1214, or the model evaluator 1215 in the data learner 1210 may be fabricated in the form of at least one hardware chip and mounted in an electronic device. For example, at least one of the data acquirer 1211, the preprocessor 1212, the training data selector 1213, the model trainer 1214, or the model evaluator 1215 may be manufactured in the form of a dedicated hardware chip for AI or as part of an existing general-purpose processor (e.g., a CPU or AP) or dedicated graphics processor (e.g., a GPU) and may be mounted in various electronic devices as described above.

Furthermore, the data acquirer 1211 the preprocessor 1212, the training data selector 1213, the model trainer 1214, and the model evaluator 1215 may be mounted in one electronic device, or be respectively mounted in different electronic devices. In an embodiment of the disclosure, the electronic device may include the computing device 130 or the image detection apparatus 110. For example, some of the data acquirer 1211, the preprocessor 1212, the training data selector 1213, the model trainer 1214, and the model evaluator 1215 may be included in the image detection apparatus 110 while the rest thereof may be included in the computing device 130. Furthermore, some of the components may be included in an electronic device while the rest thereof may be included in a server.

In addition, at least one of the data acquirer 1211, the preprocessor 1212, the training data selector 1213, the model trainer 1214, or the model evaluator 1215 may be implemented as a software module. When the at least one of the data acquirer 1211, the preprocessor 1212, the training data selector 1213, the model trainer 1214, or the model evaluator 1215 is implemented as a software module (or a program module including instructions), the software module may be stored in non-transitory computer readable recording media. Furthermore, in this case, at least one software module may be provided by an OS or application. Alternatively, some of the at least one software module may be provided by the OS while the rest thereof may be provided by the application.

Figure 14:
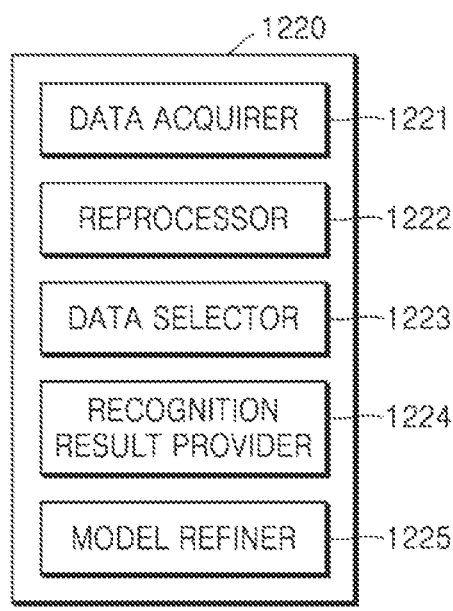
FIG. 14 is a block diagram of a configuration of a data recognizer according to an embodiment of the disclosure.

FIG. 14 is a block diagram of a configuration of the data recognizer 1220 according to an embodiment of the disclosure.

Referring to FIG. 14, according to some embodiments of the disclosure, the data recognizer 1220 may include a data acquirer 1221, a preprocessor 1222, a data selector 1223, a recognition result provider 1224, and a model refiner 1225.

The data acquirer 1221 may obtain data necessary to detect an additional information area in an image. The preprocessor 1222 may preprocess the obtained data so that the obtained data may be used. The preprocessor 1222 may process the obtained data into a preset format such that the recognition result provider 1224 to be described later may use the obtained data for detecting an additional information area in an image.

The data selector 1223 may select, from among pieces of preprocessed data, data necessary for detecting an additional information area in an image. The selected data may be provided to the recognition result provider 1224. The data selector 1223 may select some or all of the pieces of preprocessed data according to preset criteria for detecting an additional information area in an image.

The recognition result provider 1224 may detect an additional information area in an image by applying the selected data to the data recognition model. The recognition result provider 1224 may provide a recognition result according to the purpose of data recognition. The recognition result provider 1224 may apply the data selected by the data selector 1223 to the data recognition model by using the selected data as an input value. Furthermore, the recognition result may be determined by the data recognition model. The recognition result provider 1224 may provide identification information indicating the additional information area in the image.

The model refiner 1225 may modify and refine the data recognition model based on evaluation of the recognition result provided by the recognition result provider 1224. For example, the model refiner 1225 may provide the recognition result from the recognition result provider 1224 to the model trainer 1214 so that the model trainer 1214 may modify and refine the data recognition model.

At least one of the data acquirer 1221, the preprocessor 1222, the data selector 1223, the recognition result provider 1224, or the model refiner 1225 may be fabricated in the form of at least one hardware chip and be mounted in an electronic device. For example, at least one of the data acquirer 1221, the preprocessor 1222, the data selector 1223, the recognition result provider 1224, or the model refiner 1225 may be manufactured in the form of a dedicated hardware chip for AI or as part of an existing general-purpose processor (e.g., a CPU or AP) or dedicated graphics processor (e.g., a GPU) and may be mounted in various electronic devices as described above.

Furthermore, the data acquirer 1221, the preprocessor 1222, the data selector 1223, the model trainer 1224, and the model evaluator 1225 may be mounted in one electronic device, or be respectively mounted in different electronic devices. For example, some of the data acquirer 1221, the preprocessor 1222, the data selector 1223, the recognition result provider 1224, and the model refiner 1225 may be included in the electronic device while the rest thereof may be included in a server.

In addition, at least one of the data acquirer 1221, the preprocessor 1222, the data selector 1223, the recognition result provider 1224, or the model refiner 1225 may be implemented as a software module. When the at least one of the data acquirer 1221, the preprocessor 1222, the training data selector 1223, the recognition result provider 1224, or the model refiner 1225 is implemented as a software module (or a program module including instructions), the software module may be stored in non-transitory computer readable recording media. Furthermore, in this case, at least one software module may be provided by an OS or application. Alternatively, some of the at least one software module may be provided by the OS while the rest thereof may be provided by the application.

A computing device and an operation method thereof according to some embodiments of the disclosure may be implemented in the form of program instructions executable by various types of computers and may be recorded on computer-readable recording media. The computer-readable recording media may be any available media that are accessible by a computer and include both volatile and nonvolatile media and both detachable and non-detachable media. Furthermore, the computer-readable recording media may include both computer storage media and communication media. The computer storage media include both volatile and nonvolatile media and both detachable and non-detachable media implemented by any method or technique for storing information such as computer-readable instructions, data structures, program modules, or other data. Communication media generally include computer-readable instructions, data structures, program modules, other data in a modulated data signal, or other transmission mechanism, and includes any information transmission media.

Furthermore, in the present specification, the term "unit" may be a hardware component such as a processor or circuit and/or a software component that is executed by a hardware component such as a processor.

Furthermore, the image detection method according to an embodiment of the disclosure may be implemented as a computer program product including a recording medium having stored therein a program for performing the image detection method including: detecting, by using a neural network, an additional information area in a first image; obtaining style information of the additional information area from the additional information area; and detecting, in a second image, an additional information area having style information different from the style information by using a model that has learned an additional information area having new style information generated based on the style information.

An image detection apparatus and method according to embodiments of the disclosure are capable of detecting an additional information area in an image by using an AI model.

The image detection apparatus and method according to the embodiments of the disclosure are capable of obtaining style information from the additional information area.

The image detection apparatus and method according to the embodiments of the disclosure are capable of generating new style information from the obtained style information and detecting an additional information area having style information different from the previous one by using a model that has learned the new style information.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image detection apparatus comprising:
a display;
a memory storing one or more instructions; and
one or more processors configured to execute the one or more instructions stored in the memory to:
   detect, by using a neural network, a first additional information area in a first image that is output on the display;
   obtain first style information of the first additional information area from the first additional information area;
   obtain, from an external computing device, an artificial intelligence (AI) model that has learned to detect a new additional information area having new style information, based on the first style information being transmitted to the external computing device,
   update the neural network by using the AI model that has learned to detect the new additional information area having the new style information; and
   detect, in a second image that is output on the display, a second additional information area having second style information different from the first style information by using the updated AI model.

2. The image detection apparatus of claim 1, further comprising a neural network processor configured to generate the second additional information area having the second style information based on the first style information, and obtain the AI model for outputting a new image by learning the second additional information area having the second style information.

3. The image detection apparatus of claim 1, wherein any one or any combination of the one or more processors is further configured to execute the one or more instructions to obtain text information and color information from the first additional information area, and obtain the first style information from the text information and the color information.

4. The image detection apparatus of claim 3, wherein the first style information comprises at least one of a location of the first additional information area in the first image, a background color of the first additional information area, a background texture of the first additional information area, a layout of texts included in the first additional information area, a text type, a text font, a text color, or a text texture.

5. The image detection apparatus of claim 3, wherein any one or any combination of the one or more processors is further configured to execute the one or more instructions to recognize the first image based on the text information.

6. The image detection apparatus of claim 3, wherein any one or any combination of the one or more processors is further configured to execute the one or more instructions to extract a text region from the first additional information area, recognize a text in the text region, and classify the recognized text into different classes to obtain the text information.

7. The image detection apparatus of claim 6, wherein any one or any combination of the one or more processors is further configured to execute the one or more instructions to extract a feature map from the first additional information area and analyze the feature map to extract the text region.

8. The image detection apparatus of claim 6, wherein any one or any combination of the one or more processors is further configured to execute the one or more instructions to classify the text into at least one class from among a channel name, a channel number, a title, a playback time, and other information.

9. The image detection apparatus of claim 6, wherein any one or any combination of the one or more processors is further configured to execute the one or more instructions to recognize, in the text region, at least one of a number, a word, a language of the word, or a font in order to recognize the text.

10. An image detection method comprising:
   detecting, by using a neural network, a first additional information area in a first image;
   obtaining first style information of the first additional information area from the first additional information area; and
   obtaining, from an external computing device, an artificial intelligence (AI) model that has learned to detect a new additional information area having new style information based on the first style information being transmitted to the external computing device,
   updating the neural network by using the AI model that has learned to detect the new additional information area having the new style information, and
   detecting, in a second image, a second additional information area having second style information different from the first style information, by using the updated AI model.

11. The image detection method of claim 10, further comprising:
   generating the second additional information area having the second style information based on the first style information; and
   obtaining the AI model for outputting a new image by learning the second additional information area having the second style information.

12. The image detection method of claim 10, wherein the obtaining of the first style information comprises:
   obtaining text information and color information from the first additional information area; and
   obtaining the style information from the text information and the color information.

13. The image detection method of claim 12, wherein the style information comprises at least one of a location of the first additional information area in the first image, a layout of the first additional information area, a location of a text, a type of the text, a font of the text, a background color of the first additional information area, or a color of the text.

14. The image detection method of claim 12, further comprising recognizing the first image based on the text information.

15. The image detection method of claim 12, wherein the obtaining of the text information comprises:
   extracting a text region from the first additional information area;
   recognizing a text in the text region; and
   classifying the recognized text into different classes.

16. A non-transitory computer-readable recording medium having recorded thereon a program for performing an image detection method, the image detection method comprising:
   detecting, by using a neural network, a first additional information area in a first image;
   obtaining first style information of the first additional information area from the first additional information area;
   obtaining, from an external computing device, an artificial intelligence (AI) model that has learned to detect a new additional information area having new style information, based on the first style information being transmitted to the external computing device;
updating the neural network by using the AI model, and
detecting, in a second image, a second additional information area having second style information different from the first style information by using the updated AI model.

\* \* \* \* \*